(12) United States Patent
Peller

(10) Patent No.: US 6,718,418 B1
(45) Date of Patent: Apr. 6, 2004

(54) DATA BUS FOR A PLURALITY OF NODES SUPPLYING OPTICAL SIGNALS

(75) Inventor: Martin Peller, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/623,896

(22) PCT Filed: Feb. 23, 1999

(86) PCT No.: PCT/EP99/01173
§ 371 (c)(1),
(2), (4) Date: Sep. 11, 2000

(87) PCT Pub. No.: WO99/46897
PCT Pub. Date: Sep. 16, 1999

(30) Foreign Application Priority Data

Mar. 10, 1998 (DE) .......................... 198 10 287

(51) Int. Cl.[7] .............................. G06F 13/00; G02B 6/36
(52) U.S. Cl. .......................................... 710/305; 385/24
(58) Field of Search .................................. 710/100, 305, 710/316; 370/419, 420, 395.5, 400, 463, 407, 421, 446, 425; 359/118, 195, 173, 120, 121, 138, 178; 385/15, 24, 39; 709/250, 252, 253

(56) References Cited

U.S. PATENT DOCUMENTS

| 4,883,334 A | * 11/1989 | Chiarulli et al. |
| 5,341,232 A | * 8/1994 | Popp |
| 5,436,752 A | * 7/1995 | Wedding |
| 5,995,512 A | * 11/1999 | Pogue, Jr. |

* cited by examiner

Primary Examiner—Gopal C. Ray
(74) Attorney, Agent, or Firm—Crowell & Moring LLP

(57) ABSTRACT

A data bus arrangement and method whereby a plurality of nodes are connected to each other through a star coupler arrangement of a data bus. The data bus arrangement includes a logical decision gate which received a plurality of input electrical signals transmitted from a plurality of nodes with some of the signals being transmitted through an opto-electrical transducer to convert optical node signals to electrical signals output to the logical decision gate. The output of the logical decision gate is connected to each of the nodes with at least some of the nodes being connected through respected opto-electrical transducer to convert the electrical output signal from the respective logical decision gate to an optical signal fed to the nodes. In order to adjust the output signal from the logical decision gate, a signal preparation circuit provides pulse form adjustment in order to correspond to electrical input signals which enter the logical decision gate.

6 Claims, 1 Drawing Sheet

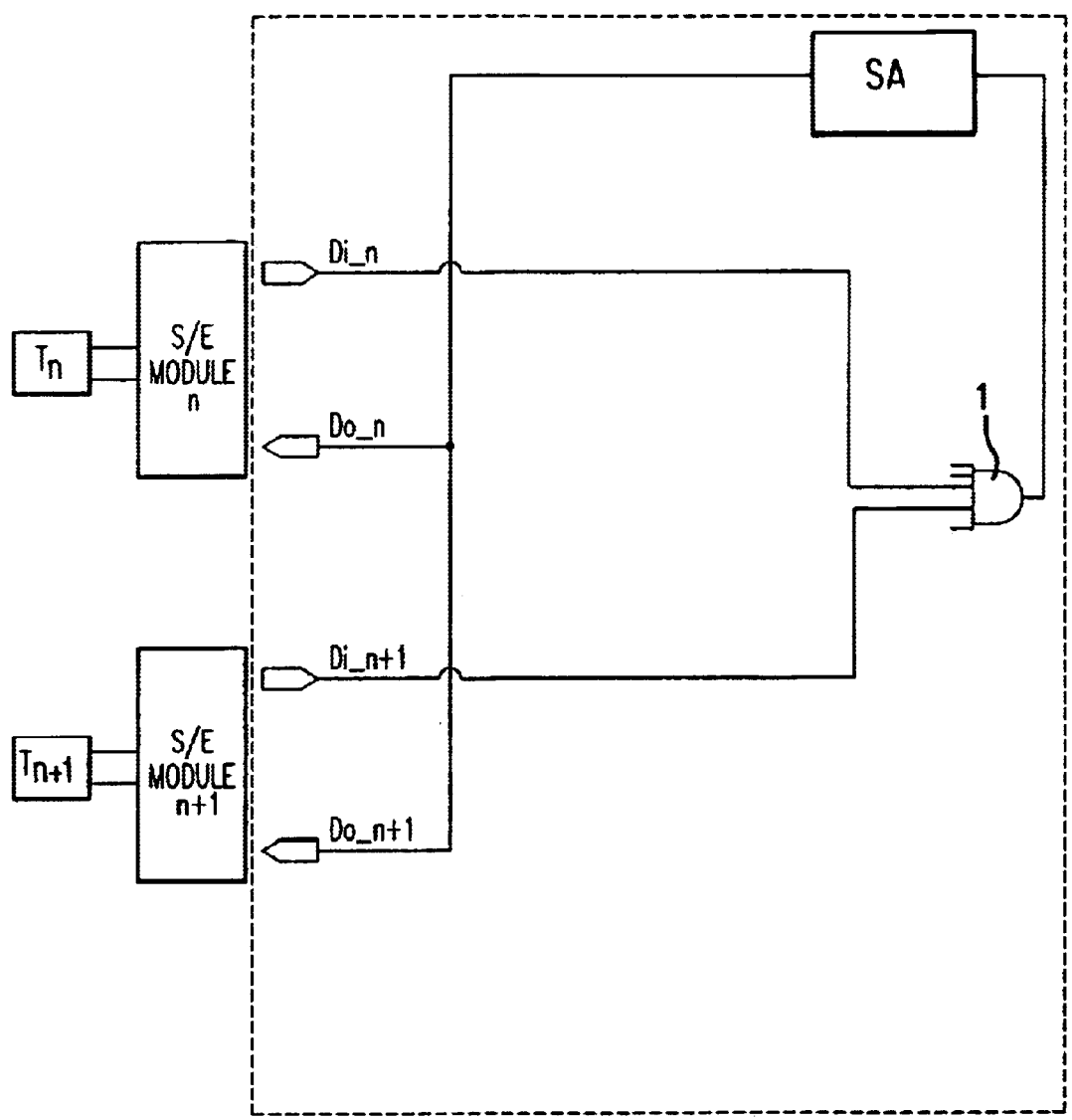

DATA BUS FOR A PLURALITY OF NODES SUPPLYING OPTICAL SIGNALS

This application claims the priority of German Patent Document 198 10 287.9 filed Mar. 10, 1998 and PCT/EP99/01173 filed Feb. 23, 1999, the disclosures of which are expressly incorporated by reference herein.

BACKGROUND AND SUMMARY OF THE INVENTION

The invention relates to a data bus for a plurality of nodes which are connected to one another. A data bus of this type is known from the German Patent Application 19720401 not previously published. A concrete specification concerning the circuit-technological layout of the data bus is not contained therein.

A circuit-technological realization of a data bus of this type is known in the form of an open collector circuit. An open collector circuit has the disadvantage, that at high rates of transmission and with many bus nodes, a relatively small resistance value must be used as collector resistance in order to achieve a sufficient steepness of the edge of the information signals present in pulse form. This leads to high currents and the necessity of the use of power transistors and power resistors as well as high power losses.

An additional problem follows when some of the nodes supply optical signals. In particular, in the case of a large number of bus nodes, a signal amplification is required in order to provide all the nodes with signals of sufficient quality. This presents the possibility of converting the signal into electric form, amplifying them, and reconverting them into optical form, with the two-time conversion having additional amplification, signal, distortions, occur, which reduce the degree of efficiency of the data bus.

The objective of the invention is to provide a data bus of the which makes possible interference-free bus communication with low circuit-technological expenditure even in the case of a large number of bus nodes.

The central element of the data bus according to the invention is the logical decision gate to whose inputs the signal outputs of the bus nodes are fed. The logical decision gate requires no expensive signal form processing devices. It transmits the signals unchanged in form. Also the required power consumption is low even in the case of a large number of nodes.

Developments of the invention are possible with nodes which supply electrical output signals as well as with nodes which generate optical output signals. The latter nodes are connected via opto-electric transducers in such a way on the data bus that the signal outputs of the nodes via each transducer of this type are fed to the logical decision gate and the output of the logical decision gate is fed via a common electric-optical transducer or by individual transducers of to the inputs of the nodes.

For a data bus which is configured as an open collector circuit known signal form processing devices such as disclosed in U.S. Pat. No. 5,684,831 are used. A device of this type is provided for each node. The configuration according to the invention for the data bus with a logical decision gate now permits reducing the circuit-technological expenditure drastically. The only requirement is to dispose a single signal preparation circuit between the logical decision gate and the inputs of the nodes. The signal preparation circuit models the pulse forms of the output signal of the logical decision gate.

This modeling can be an adjustment of the form of the output signal to the form of the input signals or an adaptation as is described in U.S. Pat. No. 5,684,831. Therein the leading edges are flattened in order to be able to distinguish the usable signal from high-frequency interference signals with extreme edge steepness.

Finally, according to additional embodiments of the invention, additional logical decision gates can be disposed between the output of the signal preparation circuit and at least one of the nodes. Thereby it is possible to separate certain sections of the data bus as needed in order, for example, to separate a faulty bus node or else to set several bus nodes into Sleep mode.

Other objects, advantages and novel features of the present invention will become apparent from the following detailed description of the invention when considered in conjunction with the accompanying drawings.

BRIEF DESCRIPTION OF THE DRAWINGS

The single FIGURE shows schematically the layout of the data bus according to the invention which achieves reliable bus communication for a plurality of bus nodes with low circuit-technological expenditure.

DETAILED DESCRIPTION OF THE PREFERRED EMBODIMENTS

A data bus serves to connect the nodes to one another which supply optical signals. The signals of the nodes (for the sake of comprehensibility two nodes $T_n$ and $T_{n+1}$ are indicated) are fed to inputs of opto-electric signal transducers $S/E_n$ and $S/E_{n+1}$ as input signals. The electric signals ($Di_{-n}$, $Di_{-n+1}$) of these transducers are linked with an AND gate 1. The number of the input and outputs of the gate corresponds to the number of the bus nodes. The output 2 of the AND gate 1 drives all the inputs ($Do_n$, $Do_{n+1}$) of the transducers $S/E_n$ and $S/E_{n+1}$. These supply optical signals in the form of a pulse which supply these signals to the nodes via optical transmission segments. In this manner each node receives all the signals which are issued by the other nodes as well as its own signal. The AND gate 1 has a significantly lower power consumption than the open collector circuit mentioned initially.

Also shown is of a signal preparation device SA at the output of the AND gate 1. Thereby, for example, distortions of signal form, which may arise through opto-electrical transducers ($S/E_n$ and $S/E_{n+1}$), can be eliminated. For example, NRZ (non-return-to-zero)-coded signals, which experience a distortion of up to 30% signal length through the transducer S/E, can be brought into a form without pulse distortion.

For the signal preparation in the device SA, for example, the same sampling process can be used as is used for the individual nodes. It is also possible to use a special signal preparation process which takes into account the special auxiliary conditions in the data bus. Thereby data transmission is significantly more robust. It is possible to filter out brief glitches. The demands on the sampling process in the individual nodes can be set lower or the tolerance with respect to pulse distortion can be increased on one transmission segment. The sampling process is clearly less susceptible to quartz jitter. To achieve cost advantages, the same robustness quartzes with lower frequency can be used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A data bus arrangement for a plurality of nodes connected to one another, said data bus arrangement comprising:

a logical decision gate having a plurality of inputs and a single output;

at least one opto-electrical transducer having a first input connected to receive an output from one of said plurality of nodes and said opto-electrical transducer providing an electrical signal output to a respective one of said inputs of said logical decision gate wherein said single output of said logical decision gate is connected to a second input of each of said opto-electrical transducers to convert said electrical single output of said logical gate to an optical signal which is output to one of said plurality of nodes, whereby interference-free bus communications for a large number of bus nodes is provided.

2. A data bus arrangement according to claim 1, further including a signal preparation circuit positioned between the output of the logical decision gate and the second input of said opto-electrical transducer whereby said signal preparation circuit adjusts the pulse form of the output signal of the logical decision gate.

3. The data bus arrangement according to claim 1, further comprises additional logic decision gates disposed between the output of the signal preparation circuit and the input of said at least one opto-electrical transducer.

4. A method for connecting a plurality of nodes to each other through a data bus, comprising the steps of:

providing an output signal from each of said plurality of nodes to each one of a plurality of opto-electrical transducers;

converting, in each of said opto-electrical transducers, the signals from respective ones of said node into an electrical signal;

outputting said electrical signals from said opto-electrical transducers to a respective one of a plurality of inputs of a logical decision gate;

outputting an electrical signal from said logical decision gate to an electrical input of each of said opto-electrical transducers; and converting, in said opto-electrical transducers, said electrical input signals into an output converted signal to respective ones of said plurality of nodes, whereby interference-free bus communications for a large number of bus nodes is provided.

5. The method according to claim 4, wherein the step of providing an output from said logical decision gate includes the step of providing said output to a signal preparation circuit to adjust the output signal pulse form.

6. The method according to claim 5, including the further step of providing additional logical decision gates disposed between the output of the signal preparation circuit and the electrical input of said opto-electrical transducer.

* * * * *